(12) United States Patent
Vakanas et al.

(10) Patent No.: US 8,426,250 B2
(45) Date of Patent: Apr. 23, 2013

(54) LASER-ASSISTED CHEMICAL SINGULATION OF A WAFER

(75) Inventors: George Vakanas, Tempe, AZ (US); George Chen, Los Gatos, CA (US); Yuval Greenzweig, Ramat Hasharon (IL); Eric Li, Chandler, AZ (US); Sergei Voronov, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 691 days.

(21) Appl. No.: 12/288,627

(22) Filed: Oct. 22, 2008

(65) Prior Publication Data

US 2010/0099238 A1 Apr. 22, 2010

(51) Int. Cl.
*H01L 21/78* (2006.01)

(52) U.S. Cl.
USPC ..... 438/113; 438/463; 438/795; 257/E21.599

(58) Field of Classification Search ........... 257/E21.599; 428/113, 463, 795, 799, 386
See application file for complete search history.

(56) References Cited

U.S. PATENT DOCUMENTS

| | | | |
|---|---|---|---|
| 4,278,867 A | 7/1981 | Tan | |
| 4,504,726 A | 3/1985 | Hosaka et al. | |
| 5,462,636 A | 10/1995 | Chen et al. | |
| 5,814,156 A | 9/1998 | Elliott et al. | |
| 6,638,800 B1* | 10/2003 | Ishihara et al. | 438/166 |
| 6,770,544 B2* | 8/2004 | Sawada | 438/462 |
| 7,776,720 B2* | 8/2010 | Boyle et al. | 438/463 |
| 2001/0007244 A1 | 7/2001 | Matsuse | |
| 2002/0086544 A1* | 7/2002 | Boyle | 438/707 |
| 2003/0228772 A1* | 12/2003 | Cowans | 438/795 |
| 2007/0017445 A1 | 1/2007 | Takehara et al. | |
| 2007/0173034 A1* | 7/2007 | Tsurume et al. | 438/463 |
| 2008/0153039 A1 | 6/2008 | Akimoto | |

\* cited by examiner

*Primary Examiner* — Zandra Smith
*Assistant Examiner* — Paul Patton
(74) *Attorney, Agent, or Firm* — Blakely, Sokoloff, Taylor & Zafman LLP

(57) ABSTRACT

The present invention discloses an apparatus including: a laser beam directed at a wafer held by a chuck mounted on a stage inside a process chamber; a focusing mechanism for the laser beam; a steering mechanism for the laser beam; an optical scanning mechanism for the laser beam; a mechanical scanning system for the stage; an etch chemical induced by the laser beam to etch the wafer and form volatile byproducts; a gas feed line to dispense the etch chemical towards the wafer; and a gas exhaust line to remove any excess of the etch chemical and the volatile byproducts.

19 Claims, 1 Drawing Sheet

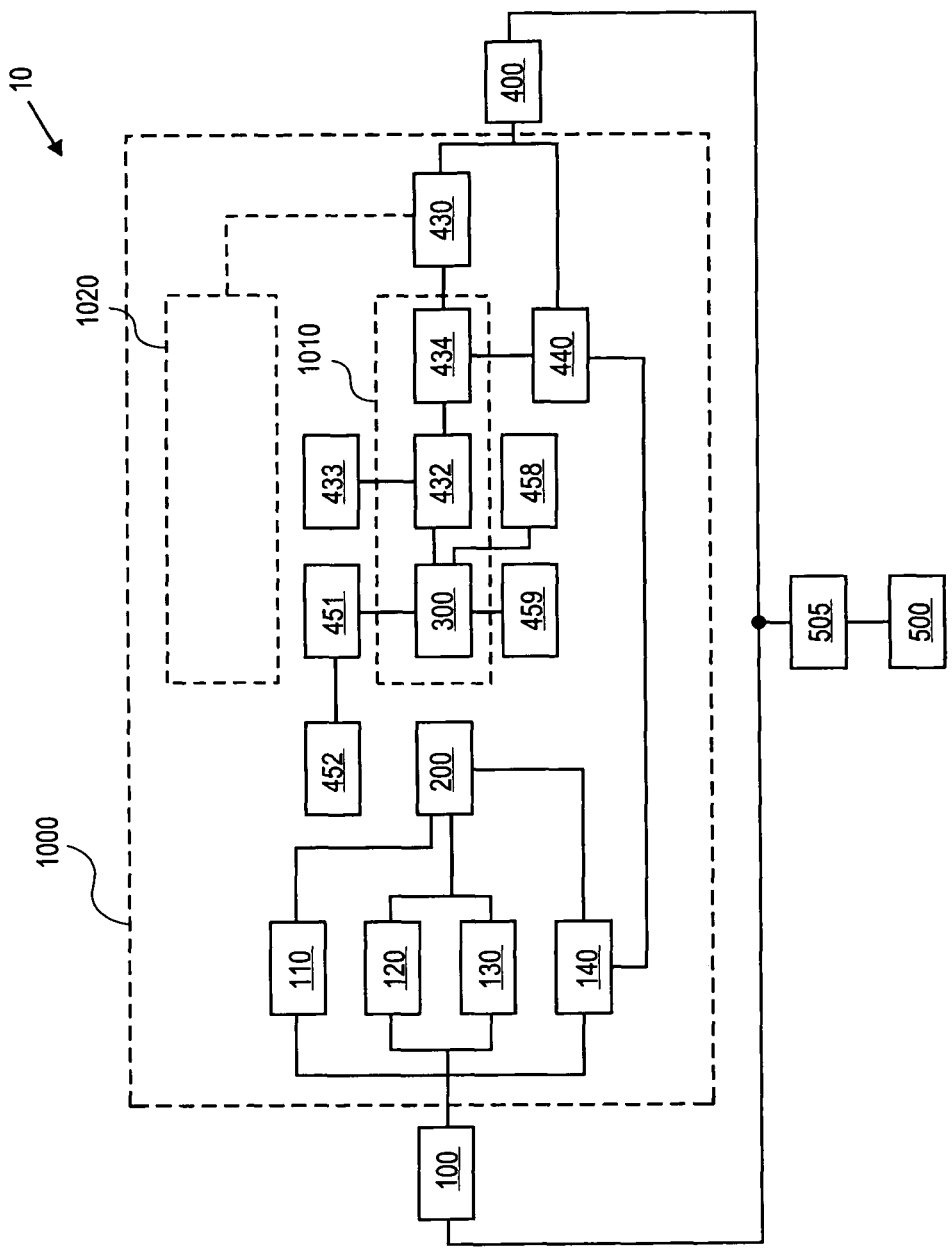

LASER-ASSISTED CHEMICAL SINGULATION OF A WAFER

BACKGROUND OF THE INVENTION

1. Field of the Invention

The present invention relates to a field of semiconductor fabrication and, more specifically, to an apparatus for and method of singulating a wafer.

2. Discussion of Related Art

Singulating a wafer involves separation of a substrate into die. A backside of a wafer to be singulated is first subjected to backgrinding, followed by polishing. Then, a laser beam is used from the backside of the wafer to form a series of modified layers inside the wafer, extending from the active surface of the wafer to the backside of the wafer. Deterioration sites are formed in the modified layers along scribe lines that are arranged in a lattice pattern across an active surface of the wafer. Then, the wafer is mounted onto a dicing tape and singulated by expanding the dicing tape to separate the wafer through the deterioration sites. Individual die are picked from the dicing tape.

Issues that may arise include rough edges, uneven street width, residual stress, and delamination in low-k dielectric layers on the die.

BRIEF DESCRIPTION OF THE DRAWINGS

FIG. 1 shows an apparatus for laser-assisted chemical singulation of a wafer according to an embodiment of the present invention.

DETAILED DESCRIPTION OF THE PRESENT INVENTION

In the following description, numerous details of specific materials, features, dimensions, processes, and sequences are set forth to provide a thorough understanding of the present invention. However, in some instances, one skilled in the art will realize that the invention may be practiced without these particular details. In other instances, one skilled in the art will also realize that certain well-known details have not been described so as to avoid obscuring the present invention.

An apparatus for and a method of laser-assisted chemical singulation of a wafer, according to various embodiments of the present invention will be described next. In an embodiment of the present invention, the laser-assisted chemical singulation is coatless and does not require a protective layer for bumps or solder, such as a photoresist. In an embodiment of the present invention, the laser-assisted chemical singulation is maskless and does not require a mask that is patterned by lithography or etch.

As shown in an embodiment of the present invention in FIG. 1, an apparatus 10 includes a substrate transport mechanism 430 to transfer a substrate 300 into and out of one or more process chambers 1010, 1020 in an enclosure 1000.

In an embodiment of the present invention, the multiple process chambers run the same process in parallel to increase feed rates (throughput). In an embodiment of the present invention, the multiple process chambers offer a choice of different processes for different products. In an embodiment of the present invention, the multiple process chambers run different processes in series, such as in sequential processing of a product.

In an embodiment of the present invention, the process chamber 1010 may be heated or cooled during operation by circulating a coolant through a heat exchanger and inside the walls of the process chamber to control a temperature of the process chamber 1010. During operation, the process chamber 1010 is separated from an environment surrounding the enclosure 1000.

In an embodiment of the present invention, the substrate 300 includes a 200 mm diameter wafer with a thickness of 670-780 um. In an embodiment of the present invention, the substrate 300 includes a 300 mm diameter wafer with a thickness of 720-830 um. In an embodiment of the present invention, the substrate 300 includes a 450 mm diameter wafer with a thickness of 870-980 um.

In an embodiment of the present invention, the substrate 300 includes a portion of a wafer.

In an embodiment of the present invention, the substrate 300 has been thinned down, such as to 75-125 um. In an embodiment of the present invention, the substrate 300 has been thinned down, such as to 25-75 um. In an embodiment of the present invention, the substrate 300 has been thinned down, such as to 10-25 um.

In an embodiment of the present invention, the substrate 300 is held on a chuck 432. In an embodiment of the present invention, the chuck 432 includes a clamp. In an embodiment of the present invention, the chuck includes a vacuum chuck. In an embodiment of the present invention, the chuck includes an electrostatic chuck.

The chuck 432 is mounted on a stage 434. The stage 434 is translated along x and y axes on a platen (not shown) with high-speed servo motors and controlled with laser interferometers. The stage 434 is translated along z axis with a piezoelectric actuator. In an embodiment of the present invention, the stage 434 may be rotated around the x, y, and z axes. The substrate, such as the wafer, 300 may be shifted, rotated, raised, and tilted before, during, or after processing.

In an embodiment of the present invention, the chuck 432 may be heated or cooled during operation by circulating a coolant through a heat exchanger 433 and inside the chuck 432 to control a temperature of the chuck 432.

A gas feed line 451 with a pump transports an etch chemical 452 to the process chamber 1010.

In an embodiment of the present invention, the etch chemical 452 includes HCl. In an embodiment of the present invention, the etch chemical 452 includes $Cl_2$. In an embodiment of the present invention, the etch chemical 452 includes a halocarbon. In an embodiment of the present invention, the etch chemical 452 includes an organometallic compound.

In an embodiment of the present invention, the etch chemical 452 is diluted with a carrier gas. In an embodiment of the present invention, the carrier gas is argon.

In an embodiment of the present invention, one or more nozzles dispense the etch chemical 452 and the carrier gas in the process chamber 1010. A gas mass flow controller adjusts the etch chemical 452 to a desired flow rate during operation.

In an embodiment of the present invention, a showerhead dispenses a purge gas 458 in the process chamber 1010. In an embodiment of the present invention, the purge gas is argon.

A gas exhaust line 459 with a pump transports any excess of the etch chemical 452 and volatile byproducts out of the process chamber 1010.

In an embodiment of the present invention, a capacitive manometer adjusts the global pressure in the process chamber 1010 to 80-240 Torr during operation. In an embodiment of the present invention, a capacitive manometer adjusts the global pressure in the process chamber 1010 to 240-600 Torr during operation. In an embodiment of the present invention, a capacitive manometer adjusts the global pressure in the process chamber 1010 to 600-1,200 Torr during operation. During operation, the local pressure in the vicinity of a laser beam 200 may be different from the global pressure.

In an embodiment of the present invention, an illumination mechanism 110 produces electromagnetic radiation, such as light, in a source. In an embodiment of the present invention, the illumination mechanism 110 filters, homogenizes, shapes, and directs the light, such as in a beam, 200 towards the chuck 432 in the process chamber 1010 in the enclosure 1000.

In an embodiment of the present invention, a focusing mechanism 120 focuses the laser beam 200, primarily in the z-axis. In an embodiment of the present invention, the focusing mechanism 120 includes a plano-convex lens. In an embodiment of the present invention, the focusing mechanism 120 includes an f-theta lens.

In an embodiment of the present invention, the focusing mechanism 120 has a focal length of 10-25 mm with a depth of focus of +/−0.5 mm. In an embodiment of the present invention, the focusing mechanism 120 has a focal length of 25-60 mm with a depth of focus of +/−1.0 mm. In an embodiment of the present invention, the focusing mechanism 120 has a focal length of 60-150 mm with a depth of focus of +/−3.0 mm. In an embodiment of the present invention, the focusing mechanism 120 has a focal length of 150-375 mm with a depth of focus of +/−7.5 mm.

In an embodiment of the present invention, a steering mechanism 130 steers the laser beam 200, primarily in the x-axis and y-axis. In an embodiment of the present invention, a galvanometer (galvo) mirror provides y-deflection while another galvanometer (galvo) mirror provides x-deflection.

In an embodiment of the present invention, the focusing mechanism 120 and the steering mechanism 130 work together through a closed-loop system to align the laser beam 200 in the x-axis, the y-axis, and the z-axis in real time, including during operation.

In an embodiment of the present invention, an optical scanning mechanism 140 scans the laser beam 200 over a wafer 300 that is clamped on a chuck 432 (held on a stage 434 that is stationary). In an embodiment of the present invention, the laser beam 200 has a scanning speed of 6-50 mm/sec. In an embodiment of the present invention, the laser beam 200 has a scanning speed of 50-300 mm/sec. In an embodiment of the present invention, the laser beam 200 has a scanning speed of 300-900 mm/sec.

In an embodiment of the present invention, the laser beam 200 is operated in a raster scan mode with a deflection plate to blank out the laser beam 200 as needed. In an embodiment of the present invention, the laser beam 200 is operated in a vector scan mode and turned on and off.

In an embodiment of the present invention, a mechanical scanning mechanism 440 scans the stage 434 (holding the chuck 432) under a laser beam 200 that is stationary.

In an embodiment of the present invention, the optical scanning mechanism 140 and the mechanical scanning mechanism 440 work together to scan the laser beam 200 and the stage 434 (holding the chuck 432) respectively.

In an embodiment of the present invention, a first computer 100 controls the illumination mechanism 110, the focusing mechanism 120, the steering mechanism 130, and the optical scanning mechanism 140. In an embodiment of the present invention, a second computer 400 controls the substrate transport 430 mechanism and the mechanical scanning mechanism 440. Both computers 100, 400 are accessed through a user interface 505 with menu-driven software 500.

In an embodiment of the present invention, the laser beam 200 has a working area of 500×250 mm². In an embodiment of the present invention, the laser beam 200 has a working area of 400×300 mm². In an embodiment of the present invention, the laser beam 200 has a working area of 350×350 mm².

The laser beam 200 is transmitted through a transparent window into the process chamber 1010 of the enclosure 1000. The window may be formed from quartz.

In an embodiment of the present invention, the laser beam 200 is from an ion laser, such as an argon ion laser.

In an embodiment of the present invention, the laser beam 200 is from a solid-state semiconductor diode laser, such as a neodymium-doped yttrium aluminum garnet ($Nd^{3+}/Y_3Al_5O_{12}$ or Nd:YAG) laser. In an embodiment of the present invention, the laser beam 200 has a wavelength, such as 1,064 nm, 532 nm, 355 nm, or 266 nm.

In another embodiment of the present invention, the laser beam 200 is from an ultraviolet (UV) light laser. In an embodiment of the present invention, the laser beam 200 has a wavelength of 351 nm (XeF). In an embodiment of the present invention, the laser beam 200 has a wavelength of 308 nm (XeCl).

In an embodiment of the present invention, the laser 200 is an excimer laser. In an embodiment of the present invention, the laser beam 200 has a wavelength of 248 nm (KrF). In an embodiment of the present invention, the laser beam 200 has a wavelength of 193 nm (ArF).

In an embodiment of the present invention, the laser beam 200 is from a continuous wave (CW) laser.

In another embodiment of the present invention, the laser beam 200 is from a pulsed laser. In an embodiment of the present invention, the laser beam 200 has a pulse repetition rate of 2.0-22.0 kHz. In an embodiment of the present invention, the laser beam 200 has a pulse repetition rate of 22.0-200.0 kHz. In an embodiment of the present invention, the laser beam 200 has a pulse repetition rate of 0.2-1.4 MHz.

In an embodiment of the present invention, the laser beam 200 has a pulse width of 1-24 ns. In an embodiment of the present invention, the laser beam 200 has a pulse width of 24-85 ns. In an embodiment of the present invention, the laser beam 200 has a pulse width of 85-255 ns.

In an embodiment of the present invention, the laser beam 200 is from an ultrafast laser. In an embodiment of the present invention, the laser beam 200 is from a picosecond laser with a pulse duration of 30-500 ($10^{-12}$) picoseconds. In an embodiment of the present invention, the laser beam 200 is a femtosecond laser with a pulse duration of 30-500 ($10^{-15}$) femtoseconds.

In an embodiment of the present invention, the laser beam 200 has a peak power of 70-500 milliwatt. In an embodiment of the present invention, the laser beam 200 has a peak power of 0.5-3.0 Watt. In an embodiment of the present invention, the laser beam 200 has a peak power of 3.0-15.0 Watt. In an embodiment of the present invention, the laser beam 200 has a peak power of 15.0-60.0 Watt.

In an embodiment of the present invention, the laser beam 200 has a shape of an ellipse in cross-section. In an embodiment of the present invention, the laser beam 200 has a ratio of long axis:short axis of 1:1 (circle). In an embodiment of the present invention, the laser beam 200 has a ratio of long axis: short axis is 2:1. In an embodiment of the present invention, the laser beam 200 has a ratio of long axis:short axis is 3:1. In an embodiment of the present invention, the laser beam 200 has a ratio of long axis:short axis is 5:1.

In an embodiment of the present invention, the width of the laser-assisted cut corresponds to the long axis. In an embodiment of the present invention, the width of the laser-assisted cut corresponds to the short axis.

In an embodiment of the present invention, the laser beam 200 has a shape that is a circle. In an embodiment of the present invention, the laser beam 200 has a spot size (diameter) of 4-15 um. In an embodiment of the present invention, the laser beam 200 has a spot size (diameter) of 15-35 um. In an embodiment of the present invention, the laser beam 200 has a spot size (diameter) of 35-75 um.

In an embodiment of the present invention, the laser beam 200 has a fixed spot size. In an embodiment of the present invention, the laser beam 200 has a variable spot size.

In an embodiment of the present invention, the laser beam 200 makes 1 pass. In an embodiment of the present invention, the laser beam 200 makes 2-12 passes. In an embodiment of the present invention, the laser beam 200 makes 12-50 passes. In an embodiment of the present invention, the laser beam 300 makes 50-100 passes.

The etch chemical 452 is induced by the laser beam 200 to etch the wafer 300. In an embodiment of the present invention, the etch is diffusion-limited or mass transfer-limited. In an embodiment of the present invention, the etch is reaction-limited.

In an embodiment of the present invention, the etch chemical 452 undergoes a photolytic dissociation or decomposition. Laser-assisted chemical etch may include discrete steps, such as diffusion of the etch chemical 452 to the wafer 300, adsorption of the etch chemical 452 to the wafer 300, absorption of energy from the laser beam 200 by the etch chemical 452, dissociation of the etch chemical 452 on the wafer 300, reaction of the etch chemical 452 with the wafer 300, formation of volatile byproducts on the wafer 300, desorption of the volatile byproducts from the wafer 300, and diffusion of the volatile byproducts away from the wafer 300.

In an embodiment of the present invention, the etch chemical 452 undergoes a pyrolytic dissociation or decomposition. Laser-assisted chemical etch may include discrete steps, such as diffusion of the etch chemical 452 to the wafer 300, adsorption of the etch chemical 452 to the wafer 300, absorption of energy from the laser beam 200 by the wafer 300, heating up of the wafer 300, dissociation of the etch chemical 452 on the wafer 300, reaction of the etch chemical 452 with the wafer 300, formation of volatile byproducts on the wafer 300, desorption of the volatile byproducts from the wafer 300, and diffusion of the volatile byproducts away from the wafer 300.

In an embodiment of the present invention, the global temperature in the process chamber 1010 is 25 (ambient) to 75 degrees Centigrade. Depending on an optical absorption coefficient and a thermal conductivity of the wafer 300, a local temperature of the wafer 300 in a vicinity of the laser beam 200 (such as within 10-20 um of the location that the laser beam 200 impinges on the wafer 300) may be considerably higher than the global temperature. In an embodiment of the present invention, the laser-assisted chemical etch of silicon in the wafer 300 occurs at a local temperature of 75-200 degrees Centigrade. In an embodiment of the present invention, the laser-assisted chemical etch of silicon in the wafer 300 occurs at a local temperature of 200-400 degrees Centigrade. In an embodiment of the present invention, the laser-assisted chemical etch of silicon in the wafer 300 occurs at a local temperature of 400-600 degrees Centigrade. If the local temperature of the wafer 300 in the vicinity of the laser beam 200 is high enough, non-volatile byproducts are removed by laser ablation or evaporation.

Some reaction steps may be transient or non-steady state. Some reaction steps may be irreversible. Some reaction steps may be serial. Some reaction steps may be parallel. Some reaction steps may compete with each other. In an embodiment of the present invention, the etch chemical 452 may undergo a combination of photolytic and thermolytic dissociation or decomposition.

In an embodiment of the present invention, the laser-assisted chemical (volumetric) removal rate for silicon in the wafer 300 is $1.2 \times 10^5$ um$^3$/sec. In an embodiment of the present invention, the laser-assisted chemical (volumetric) removal rate scales strongly with laser power. In an embodiment of the present invention, the laser-assisted chemical (volumetric) removal rate scales weakly with etch chemical gas pressure.

In an embodiment of the present invention, the laser-assisted chemical (vertical) etch rate for silicon is 3-15 nm/sec in the scribeline or street. In an embodiment of the present invention, the laser-assisted chemical etch rate for silicon is 15-60 nm/sec in the scribeline or street. In an embodiment of the present invention, the laser-assisted chemical etch rate for silicon is 60-180 nm/sec in the scribeline or street.

In an embodiment of the present invention, the laser-assisted chemical cut has a truncated v-shaped profile with a flat bottom surface (trench floor) and sharp corners. In an embodiment of the present invention, the laser-assisted chemical cut has a u-shaped profile with a flat bottom surface (trench floor) and rounded corners. In an embodiment of the present invention, the laser-assisted chemical cut has a re-entrant (undercut) profile with a flat bottom surface (trench floor) and rounded corners.

In an embodiment of the present invention, the trench floor has a roughness of 15.2 nm. In an embodiment of the present invention, the trench floor has a roughness of 20 nm root mean square (RMS).

In an embodiment of the present invention, a width of the laser-assisted chemical cut is 60-90 um. In an embodiment of the present invention, a width of the laser-assisted chemical cut is 40-60 um. In an embodiment of the present invention, a width of the laser-assisted chemical cut is 20-40 um. The width corresponds to a kerf, street, or scribeline that separates adjacent die on a wafer 300.

In an embodiment of the present invention, a depth of the laser-assisted chemical cut is 30-45 um. In an embodiment of the present invention, a depth of the laser-assisted chemical cut is 15-30 um. In an embodiment of the present invention, a depth of the laser-assisted chemical cut is 6-15 um.

In an embodiment of the present invention, an aspect ratio of depth to width of the laser-assisted chemical cut is (0.07-0.25):1.00. In an embodiment of the present invention, an aspect ratio of depth to width of the laser-assisted chemical cut is (0.25-0.75):1.00. In an embodiment of the present invention, an aspect ratio of depth to width of the laser-assisted chemical cut is (0.75-2.50):1.00. In an embodiment of the present invention, an aspect ratio of depth to width of the laser-assisted chemical cut is (3.00-4.00):1.00.

In an embodiment of the present invention, a sidewall slope of the laser-assisted chemical cut is 60-70 degrees. In an embodiment of the present invention, a sidewall slope of the laser-assisted chemical cut is 70-80 degrees. In an embodiment of the present invention, a sidewall slope of the laser-assisted chemical cut is 80-90 degrees. In an embodiment of the present invention, a sidewall slope of the laser-assisted chemical cut is 90-100 degrees (re-entrant profile).

In an embodiment of the present invention, invasiveness to an underlying device is limited to a vertical proximity of 5-10 um. In an embodiment of the present invention, invasiveness to an underlying device is limited to a vertical proximity of 10-15 um. In an embodiment of the present invention, invasiveness to an underlying device is limited to a vertical proximity of 15-20 um. The invasiveness refers to a region with thermally-induced defects, damage, or non-homogeneity. The invasiveness may be physically observable and/or electrically detectable.

In an embodiment of the present invention, the laser-assisted chemical etch produces a cut that is straighter (laterally), steeper (vertically), smoother, has less damage, or has less induced stress. In an embodiment of the present invention, the laser-assisted chemical etch produces a cut with less die chipping, microcracking, or delamination of interlevel dielectric (ILD) passivation, especially for low dielectric constant (k) or ultra-low k material. In an embodiment of the present invention, the laser-assisted chemical etch produces a cut with greater die edge fracture strength.

In an embodiment of the present invention, the laser-assisted chemical etch includes two (or more) types of etches that are performed sequentially. In an embodiment of the present invention, the two or more sequential etches are performed in situ in one process chamber 1010. In an embodiment of the present invention, the two or more sequential etches are performed in separate process chambers 1010, 1020.

In an embodiment of the present invention, a fast etch to make a rough cut in a central trench is followed by slow etches along both sides of the central trench.

In an embodiment of the present invention, a deep etch in two parallel narrow trenches along both sides of the scribeline, such as to limit lateral heat spreading (conduction) or to prevent lateral defect propagation (rip stop), is followed by a shallow central etch to connect the two parallel narrow trenches.

In an embodiment of the present invention, a wide shallow central etch is followed by a narrow deep central etch.

In an embodiment of the present invention, a narrow deep central etch is followed by a wide shallow central etch.

In an embodiment of the present invention, the laser-assisted chemical cut includes a sidewall slope which has two regions. An upper ¾ of the sidewall slope is steep and vertical while a lower ¼ of the sidewall slope is shallow and rounded near a flat bottom.

In an embodiment of the present invention, the laser-assisted chemical etch includes multiple laser beams that are connected by hardware and software into a gang which increases throughput. In an embodiment of the present invention, the multiple laser beams are separated out by beamsplitting apparatus from a single generated beam. In an embodiment of the present invention, the multiple laser beams are distinct laser beams that are generated separately.

In an embodiment of the present invention, the laser-assisted chemical etch includes two different types of laser beams. In an embodiment of the present invention, a continuous wave laser beam is followed by a pulsed laser beam.

In an embodiment of the present invention, the laser-assisted chemical etch is performed in two orthogonal orientations. A wafer is first cut into rows. Later, the rows are cut into chips.

In an embodiment of the present invention, the laser-assisted chemical etch uses a pulse width with variable length. Etch uniformity is traded off with singulation speed.

In an embodiment of the present invention, another type of switching which is faster than mechanical switching, such as optical, electro-optical, magneto-optical, or acousto-optical switching, is used, such as for blanking the laser beam 200.

In an embodiment of the present invention, dual laser beams are multiplexed to produce variable interference which reduces a minimum resolution that is achieved.

Many embodiments and numerous details have been set forth above in order to provide a thorough understanding of the present invention. One skilled in the art will appreciate that many of the features in one embodiment are equally applicable to other embodiments. One skilled in the art will also appreciate the ability to make various equivalent substitutions for those specific materials, processes, dimensions, concentrations, etc. described herein. It is to be understood that the detailed description of the present invention should be taken as illustrative and not limiting, wherein the scope of the present invention should be determined by the claims that follow.

We claim:

1. An apparatus comprising:
   a laser beam to be directed at a wafer held by a chuck mounted on a stage inside a process chamber;
   a focusing mechanism for said laser beam;
   a steering mechanism for said laser beam;
   an optical scanning mechanism for said laser beam;
   a mechanical scanning system for said stage wherein said optical scanning mechanism and mechanical scanning system work together to scan said laser beam over the wafer;
   an etch chemical induced by said laser beam to dissociate in order to etch said wafer and form volatile byproducts, wherein the dissociation is at least one of photolytic dissociation, wherein the etch chemical absorbs energy from the laser beam, and pyrolytic dissociation, wherein the wafer absorbs energy from the laser beam and the etch chemical absorbs heat energy from the wafer;
   a gas feed line to dispense said etch chemical towards said wafer; and
   a gas exhaust line to remove any excess of said etch chemical and said volatile byproducts.

2. The apparatus of claim 1 wherein said laser beam is a continuous wave laser.

3. The apparatus of claim 1 wherein said laser beam comprises a Nd:YAG laser.

4. The apparatus of claim 1 wherein said laser beam is a pulsed laser.

5. The apparatus of claim 1 wherein said laser beam comprises ultraviolet light.

6. The apparatus of claim 1 wherein said laser beam comprises an excimer laser.

7. The apparatus of claim 1 wherein said laser beam comprises a shape of an ellipse in cross-section.

8. The apparatus of claim 1 wherein said laser beam has a variable spot size.

9. The apparatus of claim 1 wherein said steering mechanism comprises galvanometer (galvo) mirrors.

10. The apparatus of claim 1 wherein said chuck comprises an electrostatic chuck.

11. The apparatus of claim 1 wherein a coolant is circulated inside said chuck to control temperature.

12. An apparatus comprising:
    a chuck for holding a wafer mounted on a stage inside a process chamber having a window;
    a laser located outside of said process chamber and positioned to direct a laser beam through said window onto said wafer on said chuck;
    an etch chemical induced by said laser beam to dissociate in order to etch said wafer and form volatile byproducts, wherein the dissociation is at least one of photolytic dissociation, wherein the etch chemical absorbs energy from the laser beam, and pyrolytic dissociation, wherein the wafer absorbs energy from the laser beam and the etch chemical absorbs heat energy from the wafer;
    a gas feed line into said chamber to dispense said etch chemical towards said wafer; and
    an exhaust line out of said process chamber.

13. The apparatus of claim 12 further comprising an optical scanning mechanism for said laser beam.

14. The apparatus of claim 12 further comprising a mechanical scanning system for said stage.

15. The apparatus of claim 12 further comprising optical scanning mechanism for said laser beam and a mechanical scanning system for said stage wherein said mechanical scanning system for said stage and said optical scanning mechanism for said laser work together to scan said laser beam over said wafer.

16. The apparatus of claim 12 wherein said laser beam is a continuous wave laser.

17. The apparatus of claim 12 wherein the coolant is circulated inside said chuck to control said temperature.

18. The apparatus of claim 12 wherein said laser beam has variable spot size.

19. The apparatus of claim 12 wherein said laser beam comprises a shape of an ellipse and cross section.

* * * * *